US008037756B2

(12) United States Patent
Caminada et al.

(10) Patent No.: US 8,037,756 B2
(45) Date of Patent: Oct. 18, 2011

(54) MICROELECTROMECHANICAL GYROSCOPE WITH OPEN LOOP READING DEVICE AND CONTROL METHOD

(75) Inventors: Carlo Caminada, Rho (IT); Luciano Prandi, Bellinzago Novarese (IT); Ernesto Lasalandra, S. Donato Milanese (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 918 days.

(21) Appl. No.: 12/030,747

(22) Filed: Feb. 13, 2008

(65) Prior Publication Data
US 2008/0190200 A1 Aug. 14, 2008

(30) Foreign Application Priority Data

Feb. 13, 2007 (EP) ..................................... 07425075

(51) Int. Cl.
G01C 19/00 (2006.01)
(52) U.S. Cl. .................. 73/504.12; 73/504.18
(58) Field of Classification Search ............... 73/504.12, 73/1.16, 1.27, 1.34, 504.04, 514.02, 1.37
See application file for complete search history.

(56) References Cited

U.S. PATENT DOCUMENTS

| 5,627,318 | A | * | 5/1997 | Fujii et al. .................. 73/514.32 |
| 5,652,374 | A | * | 7/1997 | Chia et al. ...................... 73/1.38 |
| 5,719,460 | A | * | 2/1998 | Watarai et al. ............ 310/316.01 |
| 5,866,796 | A | * | 2/1999 | Chia et al. ...................... 73/1.75 |
| 6,122,961 | A | * | 9/2000 | Geen et al. ................ 73/504.12 |
| 6,253,612 | B1 | * | 7/2001 | Lemkin et al. ............. 73/504.02 |
| 6,505,511 | B1 | * | 1/2003 | Geen et al. ................. 73/504.12 |
| 6,516,651 | B1 | * | 2/2003 | Geen .............................. 73/1.16 |
| 6,701,786 | B2 | * | 3/2004 | Hulsing, II ................. 73/514.02 |
| 6,766,689 | B2 | * | 7/2004 | Spinola Durante et al. ........................... 73/504.04 |
| 6,823,733 | B2 | * | 11/2004 | Ichinose .................... 73/504.02 |
| 6,841,838 | B2 | * | 1/2005 | Kubena et al. ................ 257/415 |
| 6,934,665 | B2 | * | 8/2005 | Rober ............................ 702/189 |
| 6,975,009 | B2 | * | 12/2005 | Kubena et al. ................ 257/417 |
| 7,275,433 | B2 | * | 10/2007 | Caminada et al. .......... 73/514.18 |
| 7,305,880 | B2 | * | 12/2007 | Caminada et al. ......... 73/504.04 |
| 7,481,111 | B2 | * | 1/2009 | Caminada et al. ......... 73/514.18 |
| 7,663,432 | B2 | * | 2/2010 | Prandi et al. ................. 329/347 |
| 7,669,475 | B2 | * | 3/2010 | Goldenberg et al. ...... 73/504.12 |
| 2001/0037683 | A1 | * | 11/2001 | Nozoe et al. ............... 73/504.16 |

(Continued)

FOREIGN PATENT DOCUMENTS

| EP | 1253399 A1 | 10/2002 |
| EP | 1715580 A1 | 10/2006 |

*Primary Examiner* — Hezron E Williams
*Assistant Examiner* — Samir M Shah
(74) *Attorney, Agent, or Firm* — Lisa K. Jorgenson; E. Russell Tarleton; Seed IP Law Group PLLC

(57) ABSTRACT

A microelectromechanical gyroscope that includes a first mass oscillatable according to a first axis; an inertial sensor, including a second mass, drawn along by the first mass and constrained so as to oscillate according to a second axis, in response to a rotation of the gyroscope; a driving device coupled to the first mass so as to form a feedback control loop and configured to maintain the first mass in oscillation at a resonance frequency; and an open-loop reading device coupled to the inertial sensor for detecting displacements of the second mass according to the second axis. The driving device includes a read signal generator for supplying to the inertial sensor at least one read signal having the form of a square-wave signal of amplitude that sinusoidally varies with the resonance frequency.

18 Claims, 5 Drawing Sheets

U.S. PATENT DOCUMENTS

| | | | |
|---|---|---|---|
| 2002/0083757 A1* | 7/2002 | Geen | 73/1.37 |
| 2002/0178813 A1* | 12/2002 | Babala | 73/504.02 |
| 2002/0189354 A1* | 12/2002 | Durante et al. | 73/504.12 |
| 2005/0268716 A1* | 12/2005 | Hrovat et al. | 73/504.12 |
| 2006/0032309 A1* | 2/2006 | Caminada et al. | 73/514.18 |
| 2006/0033588 A1* | 2/2006 | Caminada et al. | 331/154 |

* cited by examiner

MICROELECTROMECHANICAL GYROSCOPE WITH OPEN LOOP READING DEVICE AND CONTROL METHOD

BACKGROUND

1. Technical Field

The present disclosure relates to a microelectromechanical gyroscope with open-loop reading device and a control method for a microelectromechanical gyroscope.

2. Description of the Related Art

As is known, the use of microelectromechanical systems (MEMS) has witnessed an ever-increasing diffusion in various sectors of technology and has yielded encouraging results especially in the production of inertial sensors, microintegrated gyroscopes, and electromechanical oscillators for a wide range of applications.

MEMS of the above type are usually based upon microelectromechanical structures that comprise at least one mass, which is connected to a fixed body (stator) by springs and is movable with respect to the stator according to pre-determined degrees of freedom. The movable mass and the stator are capacitively coupled through a plurality of respective comb-fingered and mutually facing electrodes so as to form capacitors. The movement of the movable mass with respect to the stator, for example on account of application of an external force, modifies the capacitance of the capacitors, whence it is possible to trace back to the relative displacement of the movable mass with respect to the fixed body and hence to the applied force. Vice versa, by supplying appropriate biasing voltages, it is possible to apply an electrostatic force on the movable mass to set it in motion. In addition, in order to obtain electromechanical oscillators, the frequency response of inertial MEMS structures is exploited, which typically is of a second-order low-pass type, with a resonance frequency. By way of example, FIGS. 1 and 2 show the plot of the magnitude and phase of the transfer function between the force applied on the movable mass and its displacement with respect to the stator in an inertial MEMS structure.

In particular, MEMS gyroscopes have a more complex electromechanical structure, which includes two masses that are movable with respect to the stator and coupled to one another so as to have a relative degree of freedom. The two movable masses are both capacitively coupled to the stator. One of the masses is dedicated to driving and is kept in oscillation at the resonance frequency. The other mass is drawn along in oscillating motion and, in the case of rotation of the microstructure with respect to a pre-determined gyroscopic axis with an angular velocity, is subjected to a Coriolis force proportional to the angular velocity itself. In practice, the driven mass operates as an accelerometer that enables detection of the Coriolis force and acceleration and hence makes it possible to trace back to the angular velocity.

To operate properly, a MEMS gyroscope requires, in addition to the microstructure, a driving device, which has the task of maintaining the movable mass in oscillation at the resonance frequency, and a device for reading the displacements of the driven mass, according to the relative degree of freedom of the driving mass. Said displacements, in fact, are indicative of the Coriolis force and consequently of the angular velocity, and are detectable through electrical read signals correlated to the variations of the capacitive coupling between the driven mass and the stator. As a result of driving at the resonance frequency, the read signals, determined by the rotation of the gyroscope and correlated to the angular velocity, are in the form of dual-side-band-suppressed-carrier (DSB-SC) signals; the carrier is in this case the velocity of oscillation of the driving mass and has the same frequency as the mechanical resonance frequency.

Known reading devices detect the read signals at terminals coupled to the driven mass and demodulate them downstream of the sensing point to bring them back into base band. It is hence necessary to include purposely provided devices, among which at least one demodulator and a synchronization device, such as for example a PLL circuit, which generates a demodulation signal starting from actuation signals for the driving mass. The need to include these devices entails, however, disadvantages, principally because it causes a greater encumbrance and increases the power consumption, which, as is known, is extremely important in modern electronic devices. In addition, the synchronization devices must be specifically designed for generating also a high-frequency clock signal for the demodulator and are thus particularly complex.

BRIEF SUMMARY

The present disclosure provides a microelectromechanical gyroscope and a method for controlling a microelectromechanical gyroscope that will be free from the limitations described.

In accordance with one embodiment of the present disclosure, a microelectromechanical gyroscope is provided that includes a first mass oscillatable according to a first axis; an inertial sensor, including a second mass, drawn along by the first mass and constrained so as to oscillate according to a second axis in response to a rotation of the gyroscope; a driving device coupled to the first mass so as to form a feedback control loop and configured to maintain the first mass in oscillation at a resonance frequency; an open-loop reading device coupled to the inertial sensor and adapted to detect displacements of the second mass according to the second axis; and a read signal generator adapted to supply to the inertial sensor at least one read signal having the form of a square-wave signal of amplitude that sinusoidally varies with the resonance frequency.

In accordance with another embodiment of the present disclosure, a method for controlling a microelectromechanical gyroscope is provided, the method including the steps of providing a first mass, oscillatable according to a first axis; coupling an inertial sensor having a second mass to the first mass so that the second mass is drawn along by the first mass and oscillates according to a second axis in response to a rotation of the gyroscope; feedback controlling a movement of the first mass to maintain the first mass in oscillation at a resonance frequency; and open-loop detecting displacements of the second mass according to the second axis; wherein the step of open-loop detecting includes supplying to the inertial sensor at least one read signal having the form of a square-wave signal of amplitude that sinusoidally varies at the resonance frequency.

In accordance with another embodiment of the present disclosure, a circuit is provided for use with a first mass and a second mass coupled to the first mass to oscillate in response to the first mass and in response to movement of the device, the device including a driving circuit coupled to the first mass to form a feedback control loop to maintain the first mass in oscillation at a resonance frequency; a reading device coupled to the second mass and adapted to detect displacements of the second mass; and a read signal generator adapted to supply to the second mass at least one read signal having the form of a square-wave signal of amplitude that sinusoidally varies with the resonance frequency.

In accordance with another embodiment of the present disclosure, a system is provided, the system including a control unit; and a microelectromechanical gyroscope that includes a first mass oscillatable according to a first axis an inertial sensor, including a second mass, drawn along by the first mass and constrained so as to oscillate according to a second axis in response to a rotation of the gyroscope; a driving device coupled to the first mass so as to form a feedback control loop and configured to maintain the first mass in oscillation at a resonance frequency; an open-loop reading device coupled to the inertial sensor and adapted to detect displacements of the second mass according to the second axis; and a read signal generator adapted to supply to the inertial sensor at least one read signal having the form of a square-wave signal of amplitude that sinusoidally varies with the resonance frequency.

BRIEF DESCRIPTION OF THE SEVERAL VIEWS OF THE DRAWINGS

For a better understanding of the embodiments of the present disclosure, some embodiments thereof are now described purely by way of non-limiting example and with reference to the attached drawings, wherein.

DETAILED DESCRIPTION

In the sequel of the description, reference will be made to the use of the disclosure in a microelectromechanical gyroscope of the "yaw" type. This is not, however, to be considered in any way limiting, since the disclosure may advantageously be exploited for the fabrication of MEMS gyroscopes of any type, in particular of the "roll" type, "pitch" type and with multiple axes (biaxial or triaxial gyroscopes).

For reasons of convenience, moreover, the term "frequency" will be used to indicate angular frequencies (pulsations, rad/s). It is understood in any case that a frequency f and the corresponding angular frequency or pulsation ω are linked by the well-known relation ω=2πf.

Figure 1:
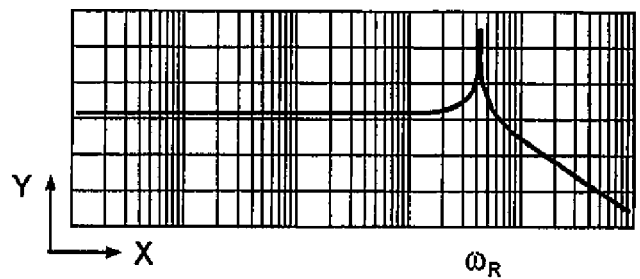
FIGS. 1 and 2 show graphs of the frequency response of a microelectromechanical gyroscope.
Figure 2:
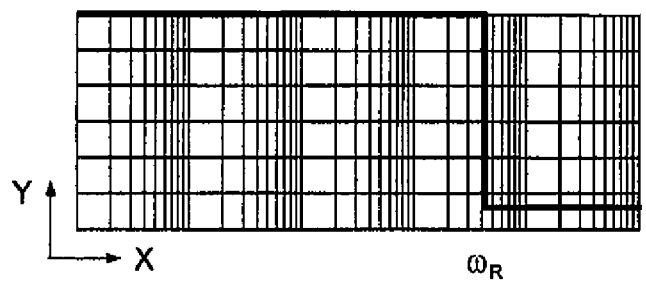
Figure 3:
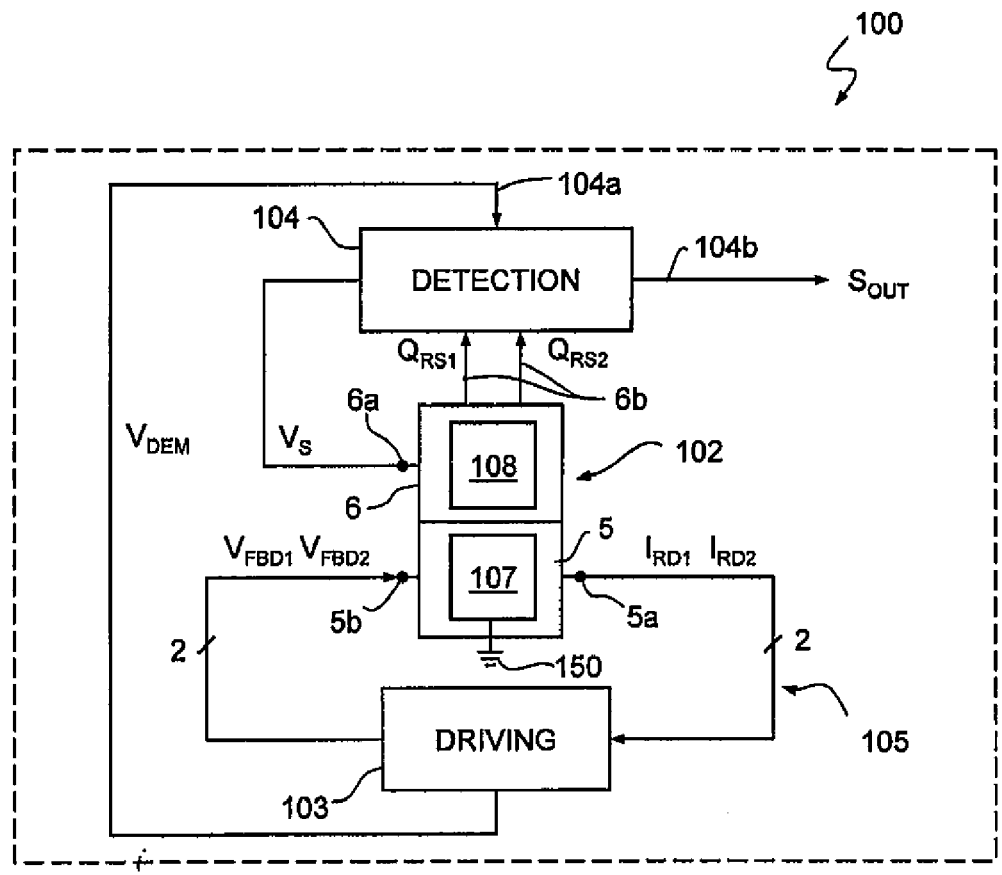
FIG. 3 is a simplified block diagram of a microelectromechanical gyroscope according to a first embodiment of the present disclosure.

A microelectromechanical gyroscope 100, illustrated in a simplified way in the block diagram of FIG. 3, comprises a microstructure 102, made by MEMS technology, a driving device 103 and a reading device 104, housed on a support 101. The microstructure 102, for example of the type described in EP-A-1 253 399, filed in the name of the present applicant, is provided with an actuation system 5 and an inertial sensor 6, including respective movable masses made of semiconductor material. More precisely, the actuation system 5 includes a driving mass 107, oscillating about a resting position according to a degree of freedom, in particular along a first axis X.

The actuation system 5 is moreover provided with read outputs 5a (defined by two stator terminals), for detecting displacements of the driving mass 107 along the first axis X, and with actuation inputs 5b (defined by two further stator terminals), for issuing actuation signals and maintaining the driving mass 107 in oscillation at the resonance frequency $\omega_R$, in a known way. The read outputs 5a and the actuation inputs 5b are capacitively coupled to the driving mass 107 in a known way, by comb-fingered electrodes (not illustrated herein). The inertial sensor 6 has a detection axis having the same direction as a second axis Y perpendicular to the first axis X and includes a detection mass 108, mechanically connected to the driving mass 107 by springs (not illustrated herein) so as to be drawn along the first axis X when the driving mass 107 is excited. In addition, the detection mass 108 is relatively movable with respect to the driving mass 107 in the direction of the second axis Y and hence has a further degree of freedom. A first terminal 6a (directly connected to the detection mass 108) and two second (stator) terminals 6b of the inertial sensor 6 enable, respectively, issuing of a read signal $V_S$ to the detection mass 108 and detection of the displacements thereof. The first terminal 6a is directly connected to the detection masses 108, whereas the second terminals 6b are capacitively coupled thereto in a known way, through comb-fingered electrodes (not illustrated herein).

The driving device 103 is connected to the microstructure 102 so as to form a driving feedback loop 105, including the driving mass 107. As will be more fully clarified in the sequel of the description, the driving device 103 exploits the driving feedback loop 105 to maintain the driving mass 107 in self-oscillation along the first axis X at its mechanical resonance frequency $\omega_R$ (for example, 25 krad/s).

The reading device 104 is of the open-loop type and, in the embodiment described herein, is configured for executing a so-called "double-ended" reading of the displacements of the detection mass 108 along the second axis Y. In particular, the reading device 104 has: a first input 104a, connected to the driving device 103 for acquiring a demodulation signal $V_{DEM}$ (in this case a voltage); second inputs, connected to respective second terminals 6b of the inertial sensor 6; a first output, connected to the first terminal 6a of the inertial sensor 6 and issuing the read signal $V_S$; and a second output 104b, which supplies an output signal $S_{OUT}$, correlated to the angular velocity Ω of the microstructure 102.

The gyroscope 100 operates in the way hereinafter described. The driving mass 107 is set in oscillation along the first axis X by the driving device 103. For this purpose, the driving device 103 is coupled to the read outputs 5a of the actuation system 5 for receiving detection currents $I_{RD1}$, $I_{RD2}$, which are correlated to the linear velocity of oscillation of the driving mass 107 along the first axis X. On the basis of the detection currents $I_{RD1}$, $I_{RD2}$ the driving device 103 generates feedback driving voltages $V_{FBD1}$, $V_{FBD2}$ having amplitude and phase such as to ensure the conditions of oscillation of the driving feedback loop 105 (unit loop gain and substantially zero phase).

The detection mass 108 is drawn in motion along the first axis X by the driving mass 107. Consequently, when the microstructure 102 rotates about a gyroscopic axis perpendicular to the plane of the axes X, Y with a given instantaneous angular velocity, the detection mass 108 is subjected to a Coriolis force, which is parallel to the second axis Y and is proportional to the instantaneous angular velocity of the microstructure 102 and to the linear velocity of the two masses 107, 108 along the first axis X. More precisely, the Coriolis force ($F_C$) is given by the equation:

$$F_C = 2M_S \Omega X'$$

where $M_S$ is the value of the detection mass 108, $\Omega$ is the angular velocity of the microstructure 102, and X' is the linear velocity of the two masses 107, 108 along the first axis X. As a result of driving at the resonance frequency $\omega_R$, the detection signals, determined by the rotation of the gyroscope and correlated to the angular velocity, are in the form of dual-sideband-suppressed-carrier (DSB-SC) signals; the carrier is in this case the oscillation velocity of the driving mass and has a frequency equal to the mechanical resonance frequency $\omega_R$.

In effect, also the driving mass 107 is subjected to a Coriolis force; however, this force is countered by the constraints that impose upon the driving mass 107 movement exclusively along the first axis X.

The Coriolis force and acceleration, which the detection mass 108 is subjected to, are read through the inertial sensor 6. In response to the excitation of the detection mass 108 by means of the read signal $V_S$, the inertial sensor 6 issues differential detection charge packets $Q_{RS1}$, $Q_{RS2}$, which are proportional to the capacitive unbalancing caused by the displacement of the detection mass 108 along the second axis Y. The detection charge packets $Q_{RS1}$, $Q_{RS2}$ are hence correlated to the Coriolis force (and acceleration) and to the instantaneous angular velocity $\Omega$ of the microstructure 102. More precisely, the charge transferred with the detection charge packets $Q_{RS1}$, $Q_{RS2}$ in successive reading cycles is amplitude modulated in a way proportional to the instantaneous angular velocity $\Omega$ of the microstructure 102. The frequency band associated to the modulating quantity, i.e., the instantaneous angular velocity, is, however, far lower than the resonance frequency $\omega_R$ (for example, approximately 30 rad/s). The detection charge packets $Q_{RS1}$, $Q_{RS2}$ are converted and processed by the reading device 104, which generates the output signal $S_{OUT}$, as explained hereinafter.

Figure 4:
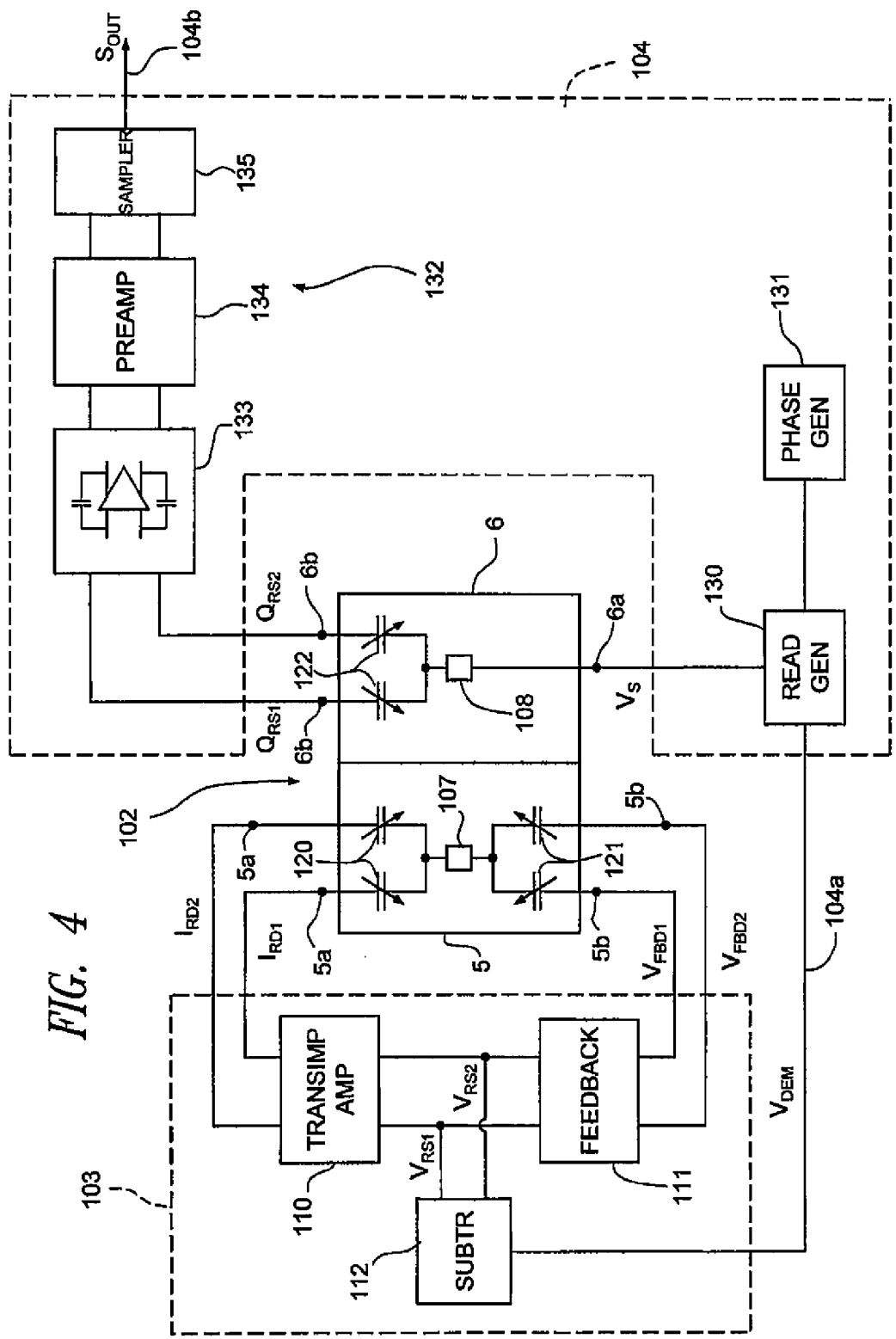
FIG. 4 is a more detailed block diagram of the microelectromechanical gyroscope of FIG. 3.

FIG. 4 shows a more detailed diagram of the microstructure 102, of the driving device 103, and of the reading device 104.

As regards the microstructure 102, FIG. 4 shows: first differential detection capacitances 120 present between the driving mass 107 and respective read outputs 5a of the actuation system 5; actuation capacitances 121, which are present between the driving mass 107 and respective actuation inputs 5b of the actuation system 5; and second detection capacitances 122, which are present between the detection mass 108 and the second terminals 6b of the inertial sensor 6. More precisely, the first differential detection capacitances 120 and the differential actuation capacitances 121 have respective terminals connected to a same actuation node 125, which is in turn coupled to the actuation mass 108.

Figure 5:
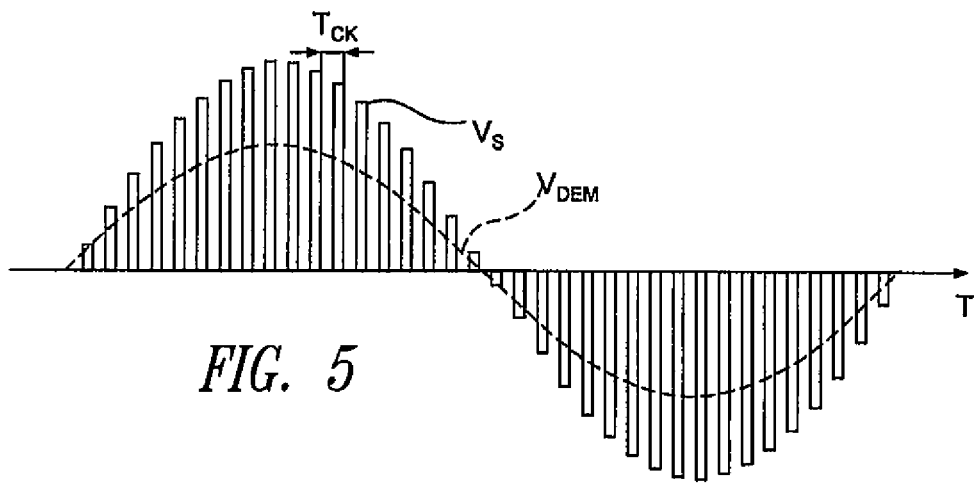
FIG. 5 is a graph that illustrates quantities regarding the microelectromechanical gyroscope of FIG. 3.

The driving device 103 comprises a transimpedance amplifier 110, a feedback stage 111, in itself known, and a subtractor circuit 112. The transimpedance amplifier 110 is of a fully-differential type and has a pair of inputs connected to the read outputs 5a of the actuation system 5 for receiving the detection currents $I_{RD1}$, $I_{RD2}$, which are correlated to the linear velocity of oscillation of the driving mass 107 along the first axis X. On the outputs of the transimpedance amplifier 110 detection voltages $V_{RD1}$, $V_{RD2}$ are hence present, which are also indicative of the linear velocity of oscillation of the driving mass 107 along the first axis X. Also the detection voltages $V_{RD1}$, $V_{RD2}$ are sinusoidal, oscillate at the resonance frequency $\omega_R$, have equal amplitude, and are 180° out of phase. The conditions of resonance are ensured by the feedback stage 111, which generates the feedback driving voltages $V_{FBD1}$, $V_{FBD2}$ so that the gain of the driving feedback loop 105 is a unitary gain and its phase is zero. The subtractor circuit 112 has inputs connected to the outputs of the transimpedance amplifier 110, for receiving the detection voltages $V_{RD1}$, $V_{RD2}$. The output of the subtractor circuit 112 is connected to the first input 104a of the reading device 104 and supplies the demodulation signal $V_{DEM}$ (see also FIG. 5). Also the demodulation signal $V_{DEM}$ is sinusoidal and oscillates at the resonance frequency $\omega_R$, because it is generated as a difference between the detection voltages $V_{RD1}$, $V_{RD2}$. In addition, given that the detection voltages $V_{RD1}$, $V_{RD2}$ are differential voltages 180° out of phase, the demodulation voltage $V_{DEM}$ has a higher absolute value as compared to that of the detection voltages.

The reading device 104 includes a read signal generator 130, a phase generator 131 and, moreover, a fully differential processing line 132 including a charge amplifier 133, a preamplifier 134, and a sampler 135.

The read signal generator 130 is a sampler and has a clock input, connected to the phase generator 131 for receiving a clock signal CK (with clock period $T_{CK}$), and an input forming the first input 104a of the reading circuit 104. The clock signal CK is asynchronous with respect to the oscillation of the driving mass 107 (in practice, the clock frequency $2\pi/T_C$ is not correlated to the resonance frequency $\omega_R$). Also the sampling carried out by the read signal generator 130 is hence asynchronous with respect to the resonance frequency $\omega_R$. The output of the read signal generator 130 is connected to a first terminal 6a of the inertial sensor 6 and supplies the read signal $V_S$.

The charge amplifier 133 has inputs connected to respective second terminals 6b of the inertial sensor 6 for receiving the detection charge packets $Q_{RS1}$, $Q_{RS2}$ produced by the inertial sensor 6 in response to the read signal $V_S$ and to the rotation of the gyroscope 100. The preamplifier 134 and the sampler 135 are cascaded to the charge amplifier 133, for processing the detection charge packets $Q_{RS1}$, $Q_{RS2}$ (converted into voltage by the charge amplifier 133) and generating the output signal $S_{OUT}$.

As previously explained, the detection charge packets $Q_{RS1}$, $Q_{RS2}$ are generated by the inertial sensor 6 in response to the excitation of the detection mass 108 by the read signal $V_S$ and are proportional to the capacitive unbalancing of the second detection capacitances 122. This capacitive unbalancing is determined also by the amplitude of the read signal $V_S$, as well as by the forces acting on the detection mass 108. Consequently, the charge transferred with the detection charge packets $Q_{RS1}$, $Q_{RS2}$ is correlated, in particular proportionally, to the amplitude of the read signal $V_S$, which varies at the resonance frequency $\omega_R$. In practice, use of the demodulation signal $V_{DEM}$ and the read signal $V_S$ for exciting the detection mass 108 enables to carry out demodulation operation. Consequently, signals derived from the voltage conversion of the detection charge packets $Q_{RS1}$, $Q_{RS2}$ are signals already shifted back to base band, because the amplitude of the read signal $V_S$ varies at the resonance frequency $\omega_R$. Advantageously, demodulation is not to be performed by the processing line 132, which is thus simple to design and, moreover, requires fewer components with respect to the processing lines necessary in conventional gyroscopes. Both the overall encumbrance and the power consumption are thus improved. In particular, it is possible to eliminate a demodulator stage and complex auxiliary circuits, such as phase-locked-loop (PLL) circuits that would otherwise be indispensable for synchronizing the operation of demodulation with the carrier frequency, i.e., the resonance frequency $\omega_R$. The disclosed embodiment is advantageous also in the case where a PLL circuit is in any case included in the feedback stage 111 of the driving circuit. In fact, a PLL circuit that is to drive a demodulator stage is complex because demodulator stages require not only for synchronization at the resonance frequency $\omega_R$, but also other clock signals at higher frequencies, but in any case controlled on the basis of the resonance frequency $\omega_R$. The advantage is obviously more considerable if the driving circuit does not include a PLL stage, but is, for example, based upon a simpler peak detector.

Figure 6:
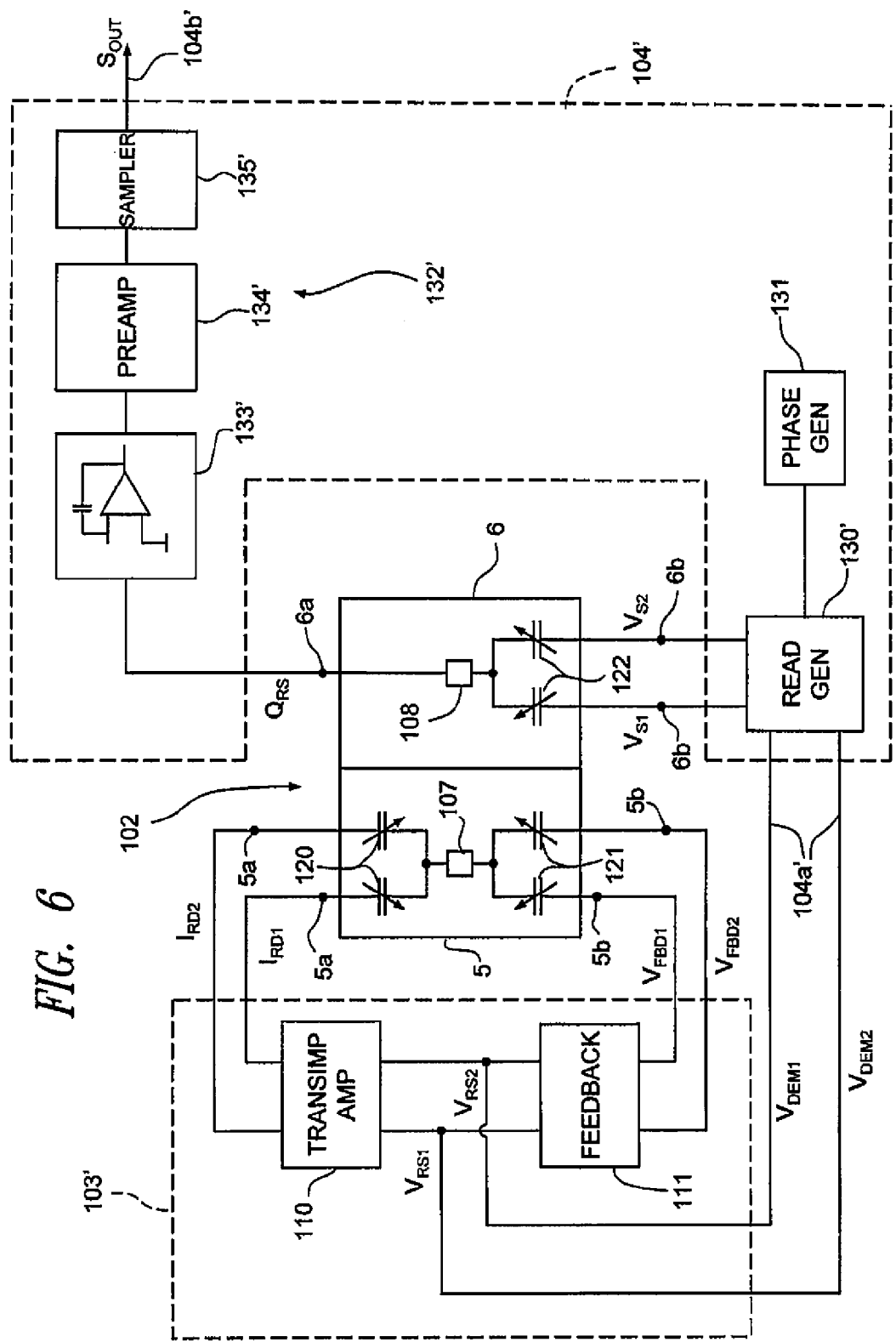
FIG. 6 is a block diagram of a microelectromechanical gyroscope according to a second embodiment of the present disclosure.

FIG. 6, in which parts that are the same as those illustrated above are designated by the same reference numbers previously used, shows a gyroscope 100' according to a second embodiment of the disclosure. The gyroscope 100' comprises the microstructure 102, a driving device 103', and a reading device 104'.

The driving device 103' is substantially identical to the driving device 103 already described with reference to FIGS. 3 and 4, except that in this case the subtractor circuit 112 is not present. In particular, the driving device 103' is connected to the microstructure 102 so as to form a driving feedback loop 105, including the driving mass 107. The driving device 103' exploits the driving feedback loop 105 to maintain the driving mass 107 in self-oscillation along the first axis X at its resonance frequency $\omega_R$.

The reading device 104' is of the open-loop type and is configured for executing a so-called "single-ended" reading of the displacements of the detection mass 108 along the second axis Y. In this case, in particular, the detection mass 108 is excited by two read signals $V_{S1}$, $V_{S2}$ 180° out of phase with respect to one another (see also FIGS. 7a, 7b), which are supplied to respective second terminals 6b of the inertial sensor 6. In response to the read signals $V_{S1}$, $V_{S2}$, the inertial sensor 6 generates detection charge packets $Q_{RS}$, which are supplied on the first terminal 6a. The detection charge packets $Q_{RS}$ are proportional to the capacitive unbalancing of the second detection capacitances 122, caused by the displacement of the detection mass 108 along the second axis Y.

More precisely, the reading device 104 has two first inputs 104a', connected to the driving device 104 for acquiring respective demodulation signals $V_{DEM1}$, $V_{DEM2}$; a second input, connected to the first terminal 6a of the inertial sensor 6, for receiving the detection charge packets $Q_{RS}$; first outputs, connected to respective second terminals 6b of the inertial sensor 6 and issuing the read signals $V_{S1}$, $V_{S2}$; and a second output 104b', which supplies an output signal $S_{OUT}$, correlated to the angular velocity Ω of the microstructure 102. In the embodiment described herein, the demodulation signals $V_{DEM1}$, $V_{DEM2}$ are voltages, which coincide with detection voltages $V_{RD1}$, $V_{RD2}$ present on the outputs of the transimpedance amplifier 110. As already mentioned, the detection voltages $V_{RD1}$, $V_{RD2}$ are sinusoidal, oscillate at the resonance frequency $\omega_R$, have equal amplitude and are 180° out of phase.

The reading device 104' further includes a read signal generator 130', the phase generator 131, and a processing line 132', including a charge amplifier 133', a preamplifier 134' and a sampler 135'. Unlike the processing line 132 of FIG. 4, the components that form the processing line 132' are of the one-input/one-output type.

Figure 7A:
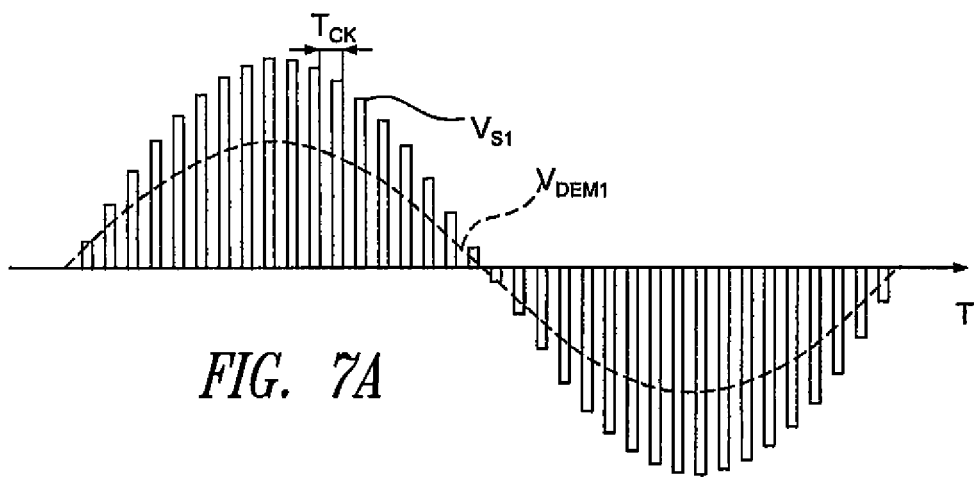
FIGS. 7a and 7b are graphs that illustrate quantities regarding the microelectromechanical gyroscope of FIG. 6.
Figure 7B:
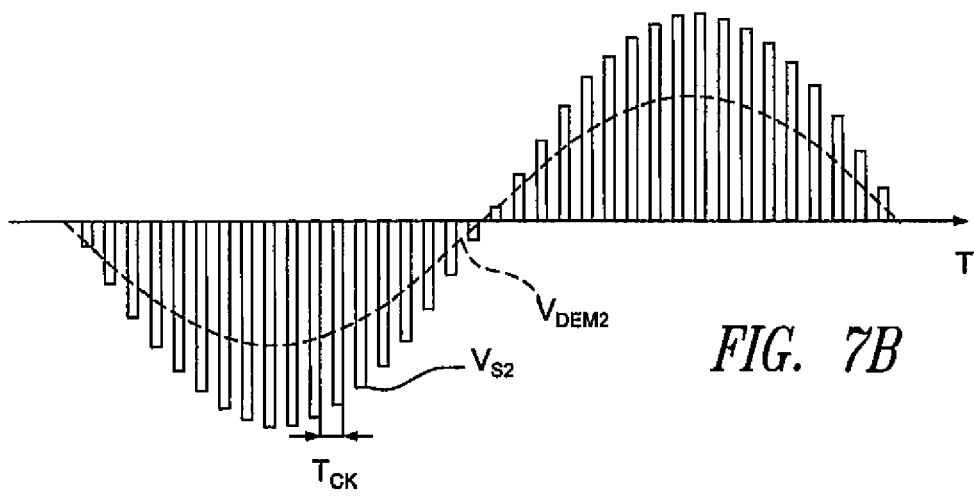

The read signal generator 130' is a sampler and has a clock input, connected to the phase generator 131 for receiving the clock signal CK (with clock period $T_{CK}$), and inputs forming respective first inputs 104a' of the reading circuit 104'. In practice, then, the inputs are connected to the outputs of the transimpedance amplifier 110 of the driving device 103 and receive respective demodulation signals $V_{DEM1}$, $V_{DEM2}$. Outputs of the read signal generator 130' are connected to respective second terminals 6b of the inertial sensor 6 and supply respective read signals $V_{S1}$, $V_{S2}$. In particular, the read signals $V_{S1}$, $V_{S2}$ are generated by sampling and amplification of respective demodulation signals $V_{DEM1}$, $V_{DEM2}$ and hence have the form of square-wave signals of amplitude that varies in a sinusoidal way at the resonance frequency $\omega_R$, with a mutual phase offset of 180°, as illustrated in FIGS. 7a, 7b.

Also in this case, the demodulation is performed directly during excitation of the detection mass 108, by supplying read signals $V_{S1}$, $V_{S2}$ of variable amplitude in a sinusoidal way at the resonance frequency $\omega_R$. The charge transferred with the detection charge packets $Q_{RS}$ is in fact proportional to the difference $V_{S1}-V_{S2}$ between the read signals $V_{S1}$, $V_{S2}$, which is in turn a sinusoidal signal of frequency equal to the resonance frequency $\omega_R$. Signals derived from the voltage conversion of the detection charge packets $Q_{RS}$ are hence translated into base band as a result of the form of the read signals $V_{S1}$, $V_{S2}$ applied to the detection mass 108. Consequently, it is not necessary to include circuits dedicated to the demodulation in the processing line 132'.

Figure 8:
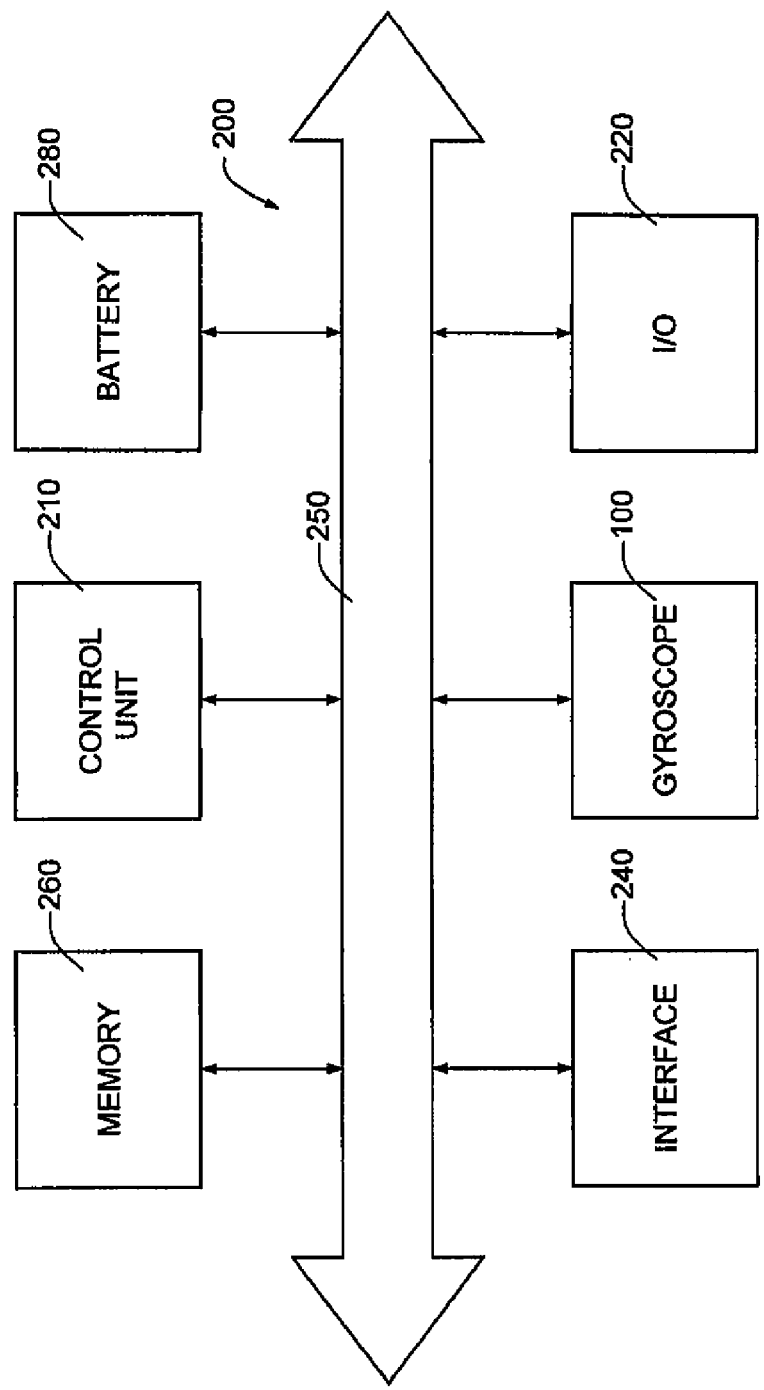
FIG. 8 is a simplified block diagram of an electronic system incorporating a microelectromechanical gyroscope according to the present disclosure.

A portion of a system 200 according to an embodiment of the present disclosure is illustrated in FIG. 8. The system 200 can be used in devices, such as, for example, a palmtop computer (personal digital assistant, PDA), a laptop or portable computer, possibly with wireless capability, a cell phone, a messaging device, a digital music reader, a digital camera or other devices designed to process, store, transmit or receive information. For example, the gyroscope 100 can be used in a digital camera for detecting movements and carrying out image stabilization. In other embodiments, the gyroscope 100 is included in a portable computer, a PDA, or a cell phone for detecting a free fall condition and activating a safety configuration. In a further embodiment, the gyroscope 100 is included in a user interface activated by movement for computers or videogame consoles.

The system 200 may include a controller 210, an input/output (I/O) device 220 (for example, a keyboard or a screen), the gyroscope 100, a wireless interface 240 and a memory 260, either of a volatile or nonvolatile type, coupled to one another through a bus 250. In one embodiment, a battery 280 can be used for supplying the system 200. It is to be noted that the scope of the present disclosure is not limited to embodiments having necessarily one or all of the devices listed.

The controller 210 may include, for example, one or more microprocessors, microcontrollers, and the like.

The I/O device 220 may be used for generating a message. The system 200 may use the wireless interface 240 for transmitting and receiving messages to and from a wireless-communication network with a radio frequency (RF) signal. Examples of wireless interface may comprise an antenna, a wireless transceiver, such as a dipole antenna, even though the scope of the present disclosure is not limited from this standpoint. In addition, the I/O device 220 may supply a voltage that represents what is stored either in the form of digital outputs (if digital information has been stored) or in the form of analog information (if analog information has been stored).

Finally, it is evident that modifications and variations may be made to the microelectromechanical gyroscope and to the method described, without thereby departing from the scope of the present disclosure, as defined in the annexed claims. In particular, it is possible to use signals different from the first read voltages (outputs of the transimpedance amplifier 110); in particular, the signals may be acquired in different points of the feedback loop 105, for example within the feedback stage 111.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A microelectromechanical gyroscope, comprising:
   a first mass oscillatable according to a first axis;
   an inertial sensor, including a second mass, drawn along by the first mass and constrained so as to oscillate according to a second axis in response to a rotation of the gyroscope;
   a driving device coupled to the first mass so as to form a feedback control loop and configured to maintain the first mass in oscillation at a resonance frequency;
   an open-loop reading device coupled to the inertial sensor and adapted to detect displacements of the second mass according to the second axis; and
   a read signal generator adapted to supply to the inertial sensor at least one read signal having the form of a square-wave signal of amplitude that sinusoidally varies with the resonance frequency.

2. The gyroscope according to claim 1, wherein the read signal generator is connected to the driving device for receiving at least one demodulation signal oscillating at the resonance frequency.

3. The gyroscope according to claim 2, wherein the read signal generator comprises a sampler and each read signal is generated by sampling of a corresponding demodulation signal.

4. The gyroscope according to claim 1, wherein the reading device is configured to execute a "double-ended" type reading of the inertial sensor.

5. The gyroscope according to claim 4, wherein the read signal generator has an input connected to the driving device for receiving the demodulation signal and an output coupled to a terminal of the inertial sensor directly connected to the second mass, the output of the read signal generator supplying the read signal.

6. The gyroscope according to claim 5, wherein the reading device comprises a charge amplifier having inputs connected to respective stator terminals of the inertial sensor for receiving sensing signals produced by the inertial sensor in response to the read signal and to the rotation of the gyroscope.

7. The gyroscope according to claim 4, wherein the driving device comprises a fully differential transimpedance amplifier and a subtractor circuit configured to generate the demodulation signal on the basis of the difference between output signals of the transimpedance amplifier.

8. The gyroscope according to claim 1, wherein the reading device is configured to execute a "single-ended" type reading of the inertial sensor.

9. The gyroscope according to claim 8, wherein the read signal generator has inputs connected to the driving device for receiving respective demodulation signals and outputs coupled to stator terminals of the inertial sensor and supplying respective read signals.

10. The gyroscope according to claim 9, wherein the reading device comprises a charge amplifier having an input coupled to a terminal of the inertial sensor directly connected to the second mass for receiving detection signals produced by the inertial sensor in response to the read signals and to the rotation of the gyroscope.

11. The gyroscope according to claim 9, wherein the driving device comprises a fully differential transimpedance amplifier and the inputs of the reading device are connected to respective outputs of the transimpedance amplifier.

12. The gyroscope according to claim 9, wherein the read signal generator is timed for sampling the demodulation signals in an asynchronous way with respect to the resonance frequency.

13. A method for controlling a microelectromechanical gyroscope, comprising the steps of:
   providing a first mass, oscillatable according to a first axis;
   coupling an inertial sensor having a second mass to the first mass so that the second mass is drawn along by the first mass and oscillates according to a second axis in response to a rotation of the gyroscope;
   feedback controlling a movement of the first mass to maintain the first mass in oscillation at a resonance frequency; and
   open-loop detecting displacements of the second mass according to the second axis;
   wherein the step of open-loop detecting comprises supplying to the inertial sensor at least one read signal having the form of a square-wave signal of amplitude that sinusoidally varies at the resonance frequency.

14. The method according to claim 13, wherein the step of feedback controlling comprises generating control signals oscillating at the resonance frequency and the step of open-loop detecting comprises acquiring at least one demodulation signal correlated to the control signals and oscillating with the resonance frequency.

15. The method according to claim 14, wherein the step of open-loop detecting comprises sampling each demodulation signal and in which each read signal is generated by sampling of a corresponding demodulation signal.

16. A system, comprising:
   a control unit; and
   a microelectromechanical gyroscope comprising:
      a first mass oscillatable according to a first axis;
      an inertial sensor that includes a second mass drawn along by the first mass and constrained so as to oscillate according to a second axis in response to a rotation of the gyroscope;
      a driving device coupled to the first mass so as to form a feedback control loop and configured to maintain the first mass in oscillation at a resonance frequency;
      an open-loop reading device coupled to the inertial sensor and adapted to detect displacements of the second mass according to the second axis; and
      a read signal generator adapted to supply to the inertial sensor at least one read signal having the form of a square-wave signal of amplitude that sinusoidally varies with the resonance frequency.

17. The system of claim 16, wherein the read signal generator has an input connected to the driving device for receiving the demodulation signal and an output coupled to a terminal of the inertial sensor directly connected to the second mass, the output of the read signal generator supplying the read signal.

18. The system of claim 17, wherein the read signal generator has inputs connected to the driving device for receiving respective demodulation signals, the reading device comprising a charge amplifier having an input coupled to a terminal directly connected to the second mass for receiving detection signals produced in response to the read signals and to the rotation of the gyroscope, the read signal generator timed for sampling the demodulation signals in an asynchronous way with respect to the resonance frequency.

* * * * *